No. 12,189. REISSUED JAN. 5, 1904.

J. COURVILLE.

SELF PLAYING ATTACHMENT FOR MUSICAL INSTRUMENTS.

APPLICATION FILED NOV. 20, 1901.

Witnesses
H. C. Smith
W. B. Hogherty.

Inventor
Joseph Courville
By M. R. Sprague & Son
Attys.

No. 12,189. Reissued January 5, 1904.

UNITED STATES PATENT OFFICE.

JOSEPH COURVILLE, OF DETROIT, MICHIGAN, ASSIGNOR TO THE FARRAND & VOTEY ORGAN COMPANY, OF DETROIT, MICHIGAN, A CORPORATION OF MICHIGAN.

SELF-PLAYING ATTACHMENT FOR MUSICAL INSTRUMENTS.

SPECIFICATION forming part of Reissued Letters Patent No. 12,189, dated January 5, 1904.

Original No. 683,727, dated October 1, 1901. Application for reissue filed November 20, 1901. Serial No. 83,047.

*To all whom it may concern:*

Be it known that I, JOSEPH COURVILLE, a citizen of the United States, residing at Detroit, in the county of Wayne and State of Michigan, have invented certain new and useful Improvements in Self-Playing Attachments for Musical Instruments, of which the following is a specification, reference being had therein to the accompanying drawings.

The invention relates to self-playing attachments for musical instruments, and has more particular reference to the construction of an expression device by which varying musical effects may be obtained.

It is the object of the invention, first, to provide means for either gradually or suddenly changing the force with which the key-actuating pneumatics are operated.

It is a further object of the invention to obtain a construction in which this variation may be produced without the operation of levers or other additional controlling devices and in which the device is fully controlled by the pumping-pedal.

The invention further consists in the peculiar construction, arrangement, and combination of parts as hereinafter described and claimed.

Figure 2:
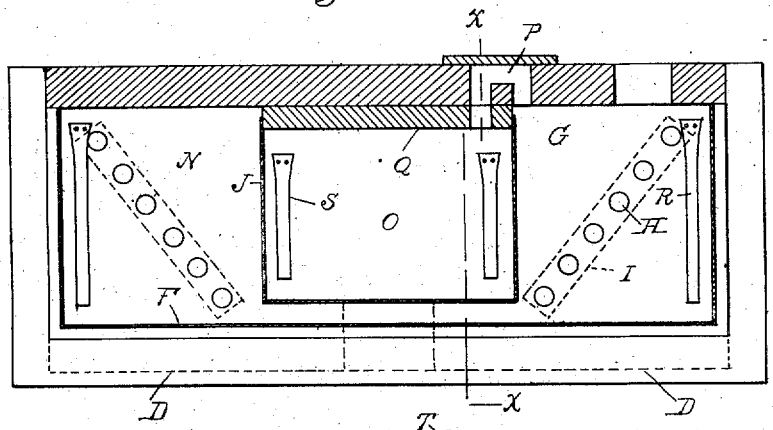
Figure 1:
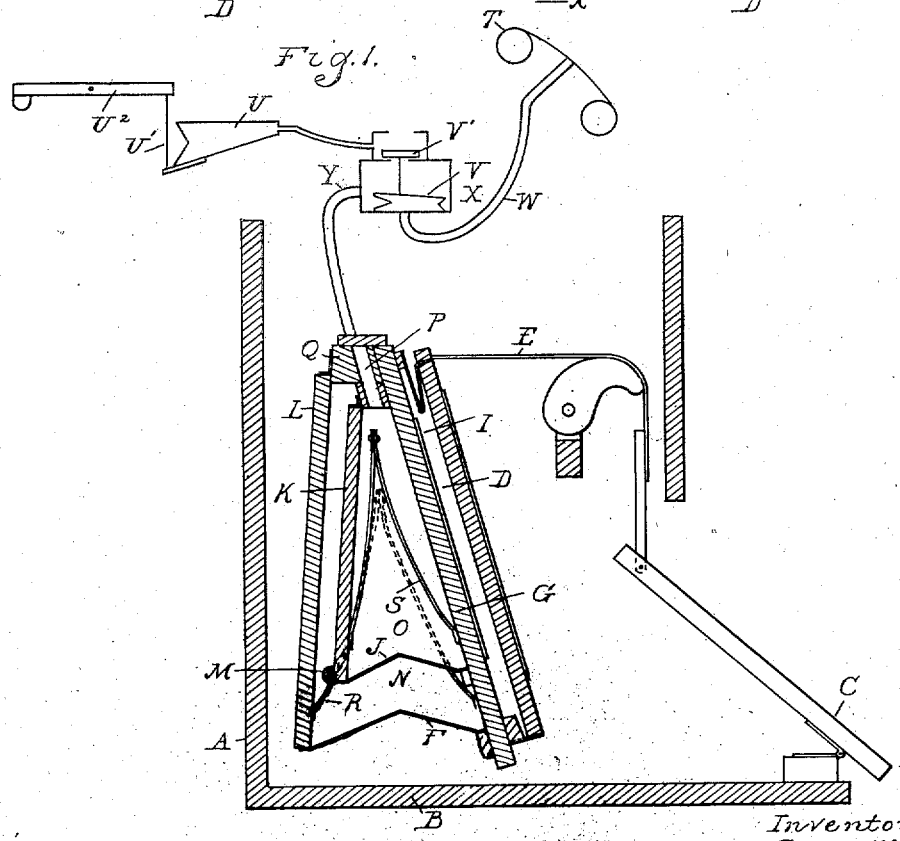

In the drawings, Figure 1 is a cross-section through the lower portion of the playing attachment on line *x x*, Fig. 2, illustrating the construction of the expression devices and also representing diagrammatically the pneumatic-action. Fig. 2 is a longitudinal section through the store-bellows and expression attachment.

A is a casing; B, is the base thereof; C, the pumping-pedals; D, the pumping-bellows connected to said pedals by straps E, and F is the store-bellows.

The parts as thus far described may be of any suitable construction, except as hereinafter set forth. The pumping-bellows and store-bellows are preferably arranged upon opposite sides of the board G, which constitutes the fixed part of each bellows, and is secured in any suitable way to the casing of the instrument. As shown in dotted lines in Fig. 2, the two pumping-bellows D are arranged upon opposite sides of the center of said board G, while the latter is provided with perforations H, constituting the air-connecting ports, which ports are covered by a flap-valve I. Centrally within the chamber of the bellows F is arranged a second bellows J, which is also attached to the board G at one side, its opposite side being formed by the hinged board K. The latter is preferably slightly separated from the hinged backboard L of the outer bellows F and at its lower end is provided with a cushioned rib or bearing M, against which the board L may bear in the operation of the device, as more fully hereinafter described. The inner bellows J divides the space within the outer bellows F into two compartments N and O, and these chambers are permanently connected to each other by the restricted passage P. As shown, this passage is formed in the ledge Q, to which the movable boards K and L are hinged, and is of an angling form, so as to produce a greater restriction to the passage of air therethrough than a straight port. The area of the port P is so proportioned to the areas of the pumping-bellows and store-bellows that the exhausting capacity of the former when in full action is in excess of the equalizing capacity of said port. At the same time the area of said port is sufficiently large to permit of an almost instantaneous equalization of pressures between the compartments O and N during the normal pumping of the bellows F. The store-bellows is provided with springs R for normally extending it, and the bellows J is also provided with expanding-springs S. The tension of these springs is properly proportioned to the wind areas acted upon, so that in the normal operation of the instrument where the pressure in the compartments O and N is equal said pressure will produce tones of medium power in the musical instrument.

The pneumatic-action and other necessary parts for operating the keys of the musical instrument form no part of the present invention and is therefore only illustrated in diagram in Fig. 1, in which T is the music-roll; U, one of the key-actuating pneumatics connecting by the rod U′ with the finger-lever $U^2$. V is the primary pneumatic controlling the valve V′ and the key-actuating pneumatic U and connected to the tracker-bar, over which the music-sheet passes, by a conduit W. The primary pneumatic V is in the chest X, which is connected by a conduit Y to the compartment N of the store-bellows.

The parts being constructed as shown and described, the operation is as follows: When the playing attachment is adjusted to the instrument and the pedals C are operated, the normal operating pressure is produced on both compartments N and O of the store-bellows, which is communicated through the conduit Y to the chest X, and whenever one of the primary pneumatics V is operated by the music-sheet the corresponding key-actuating pneumatic I will be operated with medium power. If the player desires to suddenly increase the power, as for a forzando note, by a quick stroke of the pedal he may exhaust the air in the compartment N faster than the pressure can equalize through the port P. The result is that a difference in the pressure is produced in the compartments N and O, and as the combined pressure exerted in the two compartments is always equal to the combined resistance to the springs S and R an abnormally low pressure will be produced in the compartment N. This will be communicated to the chest X and to the key-actuating pneumatics, causing the latter to be operated with proportionately greater force. If the player wishes to maintain this increased power, he can do so by continuing the pumping of the pedals; but if he desires to produce a sudden increase and an instantaneous return to normal this may be effected by a sudden single stroke of the pedal. Again, if he desires to produce a gradual increase in power it is only necessary to gradually increase the pumping of the pedals.

From the above description it will be understood that any musical effect produced by changing power may be obtained by the player without an adjustment of levers or valves, and inasmuch as the pedals, which are always in action, are used to control the changes in power said changes may be made instantaneously, if desired.

What I claim as my invention is—

1. In an autopneumatic playing attachment for musical instruments, the combination with the pneumatic-action, of a self-expanding collapsible wind-chamber or store-bellows divided into two compartments connected by a restricted passage, the latter being adapted to equalize the pressure in said compartments during normal operation, and a wind-pump connected with one of said compartments, the same being connected with the action, said wind-pump having an exhausting capacity in excess of the equalizing capacity of said restricted passage whereby an abnormally low pressure may be developed by an increased pumping action, to produce correspondingly increased power in the action.

2. In an autopneumatic playing attachment for musical instruments, an expression device comprising an outer bellows connected with the pneumatic-action, an inner bellows arranged within said outer bellows and having a restricted port communicating therewith, springs for expanding both outer and inner bellows, and a foot-operated wind-pump connected with said outer bellows having an exhausting capacity in excess of the equalizing capacity of said restricted port, for the purpose described.

3. In an autopneumatic piano-player, the combination of a valve action controlled by a traveling sheet, key-actuating pneumatics controlled by the valves thereof, and forming percussion-motors for operating the piano-keys, of a foot-operated wind-pump and a store-bellows connected therewith and to the action for normally equalizing the pulsations of said pump to give a non-pulsating pressure to operate said key-actuating pneumatics, and means by which said key-actuating pneumatics may be caused to respond temporarily to the pulsations of said pump to accentuate the operation of said key-actuating pneumatics.

4. In an autopneumatic player for percussion musical instruments, the combination with key-actuating-pneumatic motors, a foot-operated wind-pump and a regulating-bellows for normally equalizing the pulsations of said pump to produce and maintain a substantially uniform pressure upon said motor, of means for causing said motor to temporarily respond to the pulsations of said pump in accentuated action and for automatically restoring the regulating action thereof after such pulsation.

In testimony whereof I affix my signature in the presence of two witnesses.

JOSEPH COURVILLE.

Witnesses:
M. B. O'DOGHERTY,
H. C. SMITH.